J. DROTAR.
DIRECTION INDICATOR FOR AUTOMOBILES.
APPLICATION FILED JULY 18, 1921.
1,397,801.  Patented Nov. 22, 1921.
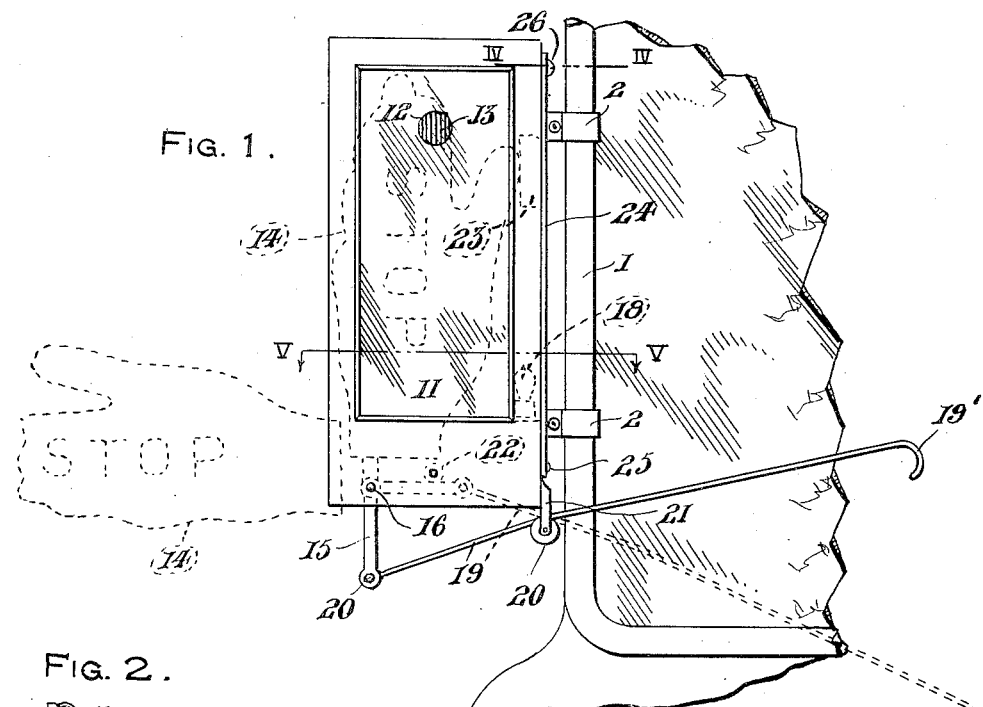
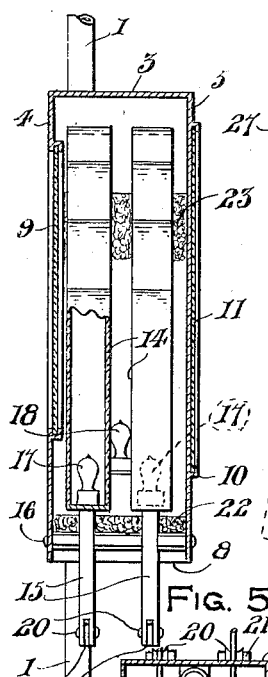
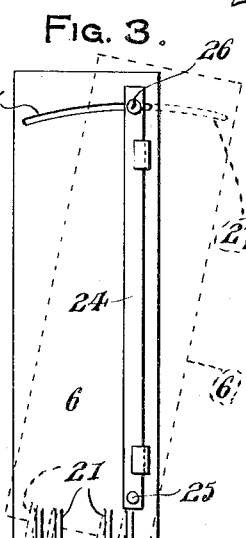
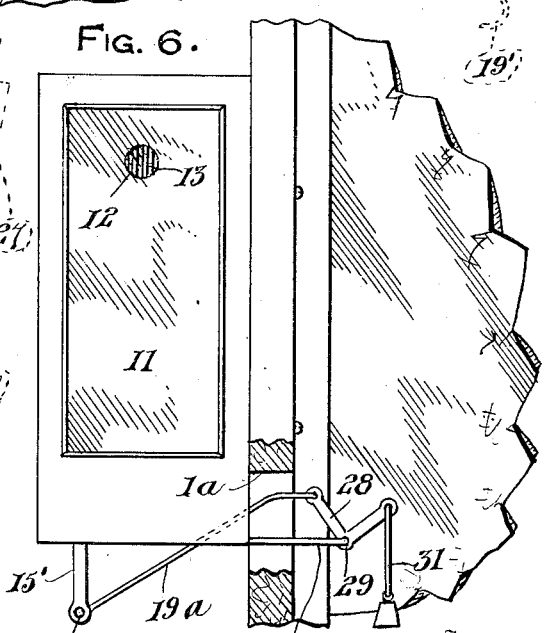
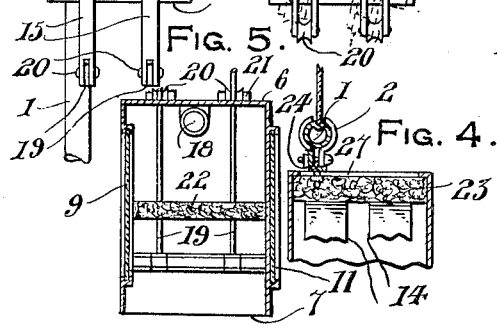
Inventor
John Drotar
By Milton E. Lowry
Attorney

UNITED STATES PATENT OFFICE.

JOHN DROTAR, OF WASHINGTON, DISTRICT OF COLUMBIA.

DIRECTION-INDICATOR FOR AUTOMOBILES.

1,397,801.   Specification of Letters Patent.   Patented Nov. 22, 1921.

Application filed July 18, 1921. Serial No. 485,472.

*To all whom it may concern:*

Be it known that I, JOHN DROTAR, a citizen of Hungary, residing at Washington, in the District of Columbia, have invented certain new and useful Improvements in Direction-Indicators for Automobiles, of which the following is a specification.

This invention relates to certain new and useful improvements in direction indicators for automobiles and has particular reference to that type of indicator wherein one or more arms are pivotally supported adjacent the windshield or forward end of the automobile adapted for lateral projection to indicate the proposed direction of travel of the automobile and containing information designed to inform a vehicle approaching from the rear whether or not the automobile is to stop, turn or travel in a forward direction.

The primary object of the invention embodies an indicator in the form of a box structure having an open side, a forward transparent glass section and a rear mirror to permit the observation of vehicles approaching from the rear, the box structure containing a lamp for illuminating the box while the mirror is provided with a relatively small red glass section, the box in effect constituting a parking light when the automobile is standing.

A further object of the invention has reference to a direction indicator for motor vehicles wherein a box like structure or casing is supported adjacent the windshield and contains one or more indicating arms or hands of hollow construction, with the hands formed of translucent material such as pyroxylin and containing an electric light controlled from a suitable switch and capable of clear observation by persons approaching from the rear when the arms are extended laterally of the casing.

A still further object of the invention is to provide a direction indicator for automobiles in the form of a casing supported on the side rail of a windshield, the casing being adjustable relative to its support to permit the vertical mounting thereof on perpendicular or inclined windshield frames.

The invention further provides a direction indicator for automobiles capable of mounting on an automobile of the closed or limousine type with pivoted arms or hands carried by the indicator and operated by a system of levers extending through a side opening in the automobile body.

With the above general objects in view and others that will become apparent as the nature of the invention is better understood, the same consists in the novel form, combination and arrangement of parts hereinafter more fully described, shown in the accompanying drawing and claimed.

In the drawing forming a part of this application and in which like characters of reference indicate corresponding parts throughout the several views, Figure 1 is a rear elevational view of an automobile direction indicator constructed in accordance with the present invention, a portion of a windshield being illustrated for supporting the indicator, Fig. 2 is a vertical sectional view of the indicator casing showing the forward transparent glass section and the rear mirror, and the indicator hands pivotally supported within the indicator casing, Fig. 3 is a side elevational view of the indicator casing and showing the adjustable mounting thereof by dotted lines to permit the mounting of the casing on windshields of the vertical or inclined type.

Fig. 4 is a detail sectional view taken on line IV—IV of Fig. 1 showing the connection between the indicator casing and the windshield, and the buffer strip for limiting the inward movement of the indicator hands, Fig. 5 is a detail sectional view taken on line V—V of Fig. 1 showing the operating rods for the indicator hands projecting exteriorly of the indicator casing and Fig. 6 is a rear elevational view of a modified form of direction indicator, and illustrated as attached to an automobile of the closed or limousine type.

Referring more in detail to the accompanying drawing and particularly to Figs. 1 to 5, there is illustrated a portion of an automobile windshield embodying a side rail 1 having the indicator casing carrying clamps 2 secured to the rail 1 of the windshield.

The indicator casing is of rectangular formation embodying a closed top 3, front and rear walls 4 and 5 respectively, a side wall 6 and an open side 7 and an open bottom 8, this construction being clearly shown in Figs. 2 and 5. The front wall 4 of the casing is cut away as shown in Fig. 2 and receives a transparent glass plate 9 while the rear wall 5 is provided with a flange 10 for supporting a mirror 11, a portion of the rear wall 5 adjacent the upper end of the mirror as shown in Fig. 1 being cut away as at 12 to receive a red glass plate 13 constituting a parking light.

The indicator arms disposed within the casing are of like construction, any number of the arms being employed and displaying suitable information to indicate the desired direction of travel of the automobile, the arms 14 being of hollow construction and preferably hand-shaped and supported adjacent their lower ends on levers 15 that are pivotally mounted upon a cross rod 16 extending between the side walls 4 and 5 of the casing adjacent the lower end thereof as shown in Figs. 1 and 2. Electric lamps 17 connected with a suitable source of electric current are disposed within the hollow indicator hands 14 while a lamp 18 is suitably supported within the casing to illuminate the same in an obvious manner.

To operate the indicator hands, pull rods 19 are pivoted as at 20 to the lower ends of the levers 15 and project across the windshield as shown in Fig. 1, the pull rods 19 being guided by traversing the rollers 20 journaled on hangers 21 depending from the side wall 6 of the casing. To limit the outward movement of the indicator hands, a cross rod extending between the side walls 4 and 5 of the casing and spaced slightly above the lever pivot 16, is provided with a fabric covering 22 while the weight of the hand will hold the same extended as indicated by dotted lines in Fig. 1. To limit the inward movement of the indicator hands and to eliminate shocks and jars incident to the operation thereof, a felt or other strip 23 is secured to the rear wall 6 of the casing as shown in Figs. 1, 2, and 4.

The clamps 2 for mounting the casing on the rail 1 of the windshield are carried by a bar 24 shown more clearly in Figs. 1, 3, and 4, the bar being pivoted at its lower end as at 25 adjacent the lower end of the rear wall 6 of the casing while the adjusting screw 26 for anchoring the upper end of the rod 24 works in an arcuate slot 27 formed in the rear wall 6 of the casing, the slot 27 being centered on the pivot 25. This construction will permit the indicator casing to be mounted on a windshield of the vertical or inclined type with the indicator casing disposed in a true perpendicular position.

From the above detailed description, it is believed that the construction and operation of the device will at once be apparent, it being noted that the lamps 17 and 18 are connected with a suitable source of electric current while the indicator hands 14 have printed or otherwise placed thereon suitable information to indicate the direction of travel of the automobile. By pulling upon the inner ends 19' of the pull rods 19, the desired hand 14 may be projected laterally of the casing and limited in such movement by the lower end of the lever 15 engaging the abutment 22. To restore the indicator hand to a position within the casing, it is only necessary to push outwardly upon the rod 19 and the indicator hand carried by the lever 15 will be moved into the casing and into engagement with the buffer strip 23. The indicator casing may be used as a parking light, a white light being shown forwardly through the transparent glass 9 while the rear red section light 13 will throw a red light to the rear.

In the form of the invention shown in Fig. 6, the indicator casing is illustrated as attached to an automobile of the closed or limousine type, the lever 15' supporting the indicator hand being connected at its lower end as at 20' to a link 19$^a$ that is connected to one arm of a bell crank 28 pivotally supported as at 29 upon the arm 30 secured to the side frames of the automobile, while the other arm of the bell crank has a handle 31 secured thereto. The link 19$^a$ projects through a side opening 1$^a$ in the side of the automobile and by pulling downwardly upon the handle 31, the bell crank 28 will shift the link 19$^a$ to move the lever 15' on its pivot to project the indicator hand laterally and exteriorly of the casing.

While there are herein shown and described the preferred embodiments of the present invention, it is nevertheless to be understood that minor changes may be made without departing from the spirit and scope of the invention as claimed.

What is claimed as new is:

1. A direction indicator for automobiles comprising a casing having an open side and bottom, means for securing the closed side of the casing to the windshield of an automobile, indicator hands pivotally supported in said casing with the lower ends extending downwardly of the casing, said indicator hands being normally housed within the casing and adapted to be projected through the open side thereof, pull rods pivotally connected with the lower ends of said indicator hands, guide rollers for the pull rods carried by said casing, and means for adjusting the angularity of the casing relative to its supporting means.

2. A direction indicator for automobiles comprising a casing having an open side and bottom, means for securing the closed side of the casing to the windshield of an automobile, indicator hands pivotally supported in said casing with the lower ends extending downwardly of the casing, said indicator hands being normally housed within the casing and adapted to be projected through the open side thereof, pull rods associated with said indicator hands, guide rollers for the pull rods carried by said casing and buffer members adapted to be engaged by the opposite ends of said indicator hands to limit the inward and outward movements thereof.

3. A direction indicator for automobiles comprising a casing having an open side and bottom, means for securing the closed side of the casing to the windshield of an automobile, indicator hands pivotally supported in said casing and adapted to be projected through the open side thereof, pull rods associated with said indicator hands, guide rollers for the pull rods carried by said casing, means for angularly adjusting the casing relative to its supporting means, and buffer members associated with said indicator hands to limit the inward and outward movements thereof.

4. A direction indicator for automobiles comprising in combination with an automobile windshield, a casing, clamps carried by said casing for engaging the windshield, levers pivotally mounted adjacent the lower end of the casing, illuminated indicator hands carried by said lever, pull rods connected to the lower ends of said levers and extending across the front of the windshield, guiding devices for said rods carried by the casing, and adjustable connections between said clamps and casing to permit angular adjustment of the casing.

5. A direction indicator for automobiles comprising in combination with an automobile windshield, a casing, a bar pivoted at its lower end to said casing, said casing having an arcuate slot adjacent the upper end thereof, an adjusting screw carried by the upper end of said bar and extending through said slot, clamps carried by said bar for engagement with the windshield, illuminated indicator hands pivotally mounted within the casing and pull rods associated with said indicator hands and extending across the windshield.

6. In a direction indicator for automobiles wherein a casing is supported on the windshield of an automobile with indicator arms pivotally mounted within the casing and adapted for lateral projection therefrom, said casing having a transparent glass section in the front wall thereof, a mirror carried by the rear wall of the casing, said mirror having a transparent section and a red reflector associated with the transparent section.

7. In a direction indicator for automobiles, a casing, guide rollers supported by said casing, a bar pivoted at its lower end to said casing and adjustably connected at its upper end to the casing, mounting clamps for the casing carried by said bar, indicator hands pivoted within the casing and pull rods associated with the indicator hands and guided by said rollers.

8. In a direction indicator for automobiles, a casing, indicator hands pivoted therein, bell cranks supported on the automobile adjacent said casing, link connections between said bell cranks and indicator hands and handles secured to said bell cranks for moving the indicator hands through the medium of the link connections.

In testimony whereof I affix my signature.

JOHN DROTAR.